(12) United States Patent
Ito et al.

(10) Patent No.: US 7,779,900 B2
(45) Date of Patent: Aug. 24, 2010

(54) AIR CONDITIONER FOR VEHICLE USE

(75) Inventors: Koji Ito, Nagoya (JP); Takahiro Tokunaga, Kosai (JP); Yoshihiko Okumura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/455,853

(22) Filed: Jun. 8, 2009

(65) Prior Publication Data

US 2009/0250194 A1    Oct. 8, 2009

Related U.S. Application Data

(62) Division of application No. 10/793,514, filed on Mar. 4, 2004, now abandoned.

(30) Foreign Application Priority Data

Mar. 7, 2003   (JP)   ............................. 2003-061583

(51) Int. Cl.
*B60H 1/00*   (2006.01)

(52) U.S. Cl. ..................... 165/202; 165/42; 165/43; 165/103; 165/203; 454/156; 454/160; 454/161; 237/12.3 A; 237/12.3 B; 251/901

(58) Field of Classification Search ................. 165/202, 165/203, 204, 42, 43, 103; 454/121, 126, 454/156, 160, 161; 237/12.3 A, 12.3 B; 251/901
See application file for complete search history.

(56) References Cited

U.S. PATENT DOCUMENTS

| 1,138,994 | A | 5/1915 | Steele |
| 4,084,617 | A | 4/1978 | Happe |

(Continued)

FOREIGN PATENT DOCUMENTS

JP    3-281423    12/1991

(Continued)

OTHER PUBLICATIONS

Notice of Reasons for Rejection dated Sep. 5, 2006 in Japanese Application No. 2003-061583 with English Translation.

*Primary Examiner*—John K Ford
(74) *Attorney, Agent, or Firm*—Harness, Dickey & Pierce, PLC

(57) ABSTRACT

Both an air mixing door (9) for the cold air for adjusting a passage area of the cold air passage (6); and an air mixing door (10) for the hot air for adjusting a passage area of the hot air passage (7) are composed of a sliding door for adjusting the passage area when the air mixing door (9) for the cold air and the air mixing door (10) for the hot air are slid in a direction perpendicular to the flow of air in both the passages (6, 7), and while one of the air mixing door (9) for the cold air and the air mixing door (10) for the hot air is maintaining one of the passages (6, 7) in a fully opened state, an operating position of the other door is adjusted so that a passage area of the other passage is adjusted and a temperature of the air blowing out into a vehicle compartment is adjusted.

4 Claims, 8 Drawing Sheets

U.S. PATENT DOCUMENTS

| | | |
|---|---|---|
| 5,162,020 A | 11/1992 | Asano et al. |
| 5,699,851 A | 12/1997 | Saida et al. |
| 5,701,949 A | 12/1997 | Yamaguchi et al. |
| 5,893,407 A | 4/1999 | Okamoto et al. |
| 5,899,262 A | 5/1999 | Yamaguchi et al. |
| 6,036,594 A | 3/2000 | Kwon et al. |
| 6,045,444 A * | 4/2000 | Zima et al. .................. 454/121 |
| 6,273,811 B1 | 8/2001 | Pawlak |
| 6,293,339 B1 | 9/2001 | Uemura et al. |
| 6,508,703 B1 | 1/2003 | Uemura et al. |

FOREIGN PATENT DOCUMENTS

| | | |
|---|---|---|
| JP | 6-71222 | 10/1994 |
| JP | 9-20126 | 1/1997 |
| JP | 2002-79819 | 3/2002 |

* cited by examiner

FILM DOOR IS FULLY OPENED

FILM DOOR IS FULLY CLOSED

AIR CONDITIONER FOR VEHICLE USE

CROSS-REFERENCE TO RELATED APPLICATIONS

This application is a divisional Application of U.S. patent application Ser. No. 10/793,514 filed on Mar. 4, 2004. This application claims the benefit and priority of JP 2003-061583, filed Mar. 7, 2003. The entire disclosures of each of the above applications are incorporated herein by reference.

BACKGROUND OF THE INVENTION

1. Field of the Invention

The present invention relates to an air conditioner for vehicle use in which the blowing air temperature is adjusted when a ratio of the volume of a cold air to the volume of a hot air is adjusted.

2. Description of the Related Art

Concerning the blowing air temperature adjusting system provided in an air conditioner for vehicle use, in a typical system, the air mixing type temperature adjusting system adjusts a ratio of the volume of a cold air to the volume of a hot air so as to adjust the blowing air temperature.

Concerning the air mixing door which is a temperature adjusting means in this air mixing type air temperature adjusting system, a plate door type and a film door type air mixing door are well known.

FIG. 8A is a view showing a case in which the air mixing door is composed of a plate door. When the air mixing door 30, composed of a one piece plate door, is rotated round the rotary shat 31, the area of the cold air passage 6, which bypasses the heater core 5, and the area of the hot air passage 7, which is provided on the heater core 5 side, are adjusted so as to adjust a ratio of the volume of a cold air to the volume of a hot air.

In this connection, in FIG. 8A, the broken line position 30a of the air mixing door 30 is the maximum cooling position at which the cold air passage 6 is fully opened and the hot air passage 7 is fully closed, and the one-dotted chain line position 30b is the maximum heating position at which the hot air passage 7 is fully opened and the cold air passage is fully closed.

FIG. 9A is a view showing a case in which the air mixing door 40 is composed of a film door which is made of a flexible thin film member 40a. As shown in FIG. 9B, the opening 40b, in which air passes through, is provided on the thin film member 40a. The upper and the lower end portion of the thin film member 40a are connected to the winding shafts 41, 42. When both the winding shafts 41, 42 are rotated being interlocked with each other, the upper and the lower end portion of the thin film member 40a are wound round the winding shafts 41, 42. Alternatively, the upper and the lower end portion of the thin film member 40a are sent out (rewound) from the winding shafts 41, 42. The intermediate portion of the thin film member 40a is guided by the intermediate guide portion 43.

When both the winding shafts 41, 42 are rotated, the thin film member 40a moves across the cold air passage 6 and the hot air passage 7. Therefore, an overlapping position, at which the opening 40b of the thin film member 40a overlaps the cold air passage 6 and the hot air passage 7, is changed, so that the passage (opening) areas of the cold air passage 6 and the hot air passage 7 can be adjusted.

In the former case of the air mixing door 30 composed of the plate door, it is necessary to provide an operation space, in which the plate door is rotated, in the case 2. Therefore, it is disadvantageous that the dimensions of the case 2 are increased.

Further, the following problems may be encountered. When the air mixing door 30 is rotated from the maximum cooling position 30a to the intermediate temperature controlling position (shown by the solid line), the hot air passage 7 in the rotary direction of the plate door is opened, and at the same time, the passages (the passages in the perpendicular direction to the surface of FIG. 8A) on the right and the left of the plate door are opened. Therefore, the area of the hot air passage 7 is suddenly increased.

When the air mixing door 30 is rotated from the maximum heating position 30b to the intermediate temperature controlling position (the solid line position), the cold air passage 7 in the plate door rotating direction is opened, and at the same time, the passages on the right and the left (the passages perpendicular to the surface of FIG. 8A) of the plate door are opened. Therefore, the area of the cold air passage 6 is suddenly increased.

On the other hand, when the air mixing door 30 is operated at the intermediate temperature controlling position exemplarily shown by the solid line in the view, as the right plate door passage and the left plate door passage (shown by the solid line) of the cold air passage 6 and the hot air passage 7 have already been opened, the areas of the cold air passage 6 and the hot air passage 7 are gradually changed with respect to the change in the rotary angle of the plate door.

As a result, the control characteristic of controlling the blowing air temperature by the air mixing door composed of the plate door is deteriorated as shown in FIG. 8B. The axis of abscissa of FIG. 8B represents a rotary angle of the air mixing door 30. The rotary angle at the maximum cooling position 30a is set at 0°, and the rotary angle at the maximum heating position 30b is set at the maximum angle θ.

As shown in FIG. 8B, the following characteristic is provided. The blowing air temperature is suddenly changed with respect to the rotary angle of the air mixing door 30 in the regions (1) and (2) in the neighborhoods of the maximum cooling position 30a and the maximum heating position 30b. Further, the blowing air temperature is gradually changed in the intermediate temperature control region (3). Therefore, in the region (1) in the neighborhood of the maximum cooling region 30a and in the region (2) in the neighborhood of the maximum heating region 30b, it becomes difficult to control the blowing air temperature.

On the other hand, in the latter case of the air mixing door 40 composed of a film door, the following advantages can be provided. As the thin film member 40a moves across the cold air passage 6 and the hot air passage 7, it is unnecessary to provide a rotary operation space, which is different from the case in which the plate door is used. Therefore, the dimensions of the case 2 can be reduced.

Further, as a current of air always flows in the cold air passage 6 and the hot air passage 7 passing through only in the opening 40b provided on the thin film member 40a, the areas of the cold air passage 6 and the hot air passage 7 can be changed by a predetermined ratio with respect to the change in the moving position of the thin film member 40a. Therefore, the blowing air temperature can be substantially linearly adjusted by the change in the position of the opening 40b of the thin film member 40a over all the region between the maximum cooling state to the maximum heating state. Accordingly, the air mixing door 40 composed of the film door is advantageous in that the blowing air temperature control characteristic can be improved as compared with the case in which the plate door is used.

In this connection, in FIG. 9C, "O" on the axis of abscissa represents the maximum cooling position at which the opening 40b on the thin film member 40a overlaps the cold air passage 6 so that the cold air passage 6 can be fully opened, and at the same time the film portion of the thin film member 40a overlaps the hot air passage 7 so that the hot air passage 7 can be fully closed. In FIG. 9C, "L" on the axis of abscissa represents the maximum heating position at which the opening 40b of the thin film member 40a overlaps the hot air passage 7 so that the hot air passage 7 can be fully opened, and at the same time the film portion of the thin film member 40a overlaps the cold air passage 6 so that the cold air passage 6 can be fully closed.

However, as the opening 40b, the area of which is predetermined, which is provided on the thin film member 40a composing the film door, is moved and the passage areas of the cold air passage 6 and the hot air passage 7 are adjusted by the opening 40b, when the opening 40b on the thin film member 40a is moved to the intermediate temperature control position between the maximum cooling position and the maximum heating position as shown in FIG. 9A and the blowing air temperature is adjusted at a value in the intermediate temperature region close to 25° C., the passage area in the case 2 is necessarily restricted by the opening area of the opening 40b.

In the case where the air mixing door 30 composed of the plate door is used, a current of air flows in the cold air passage 6 and the hot air passage 7 at all times. Therefore, it is possible to reduce a pressure loss of draft generated in the case 2. However, in the case where the air mixing door 40 composed of the film door is used, the passage area in the case 2 is restricted by the opening area of the opening 40b at all times. Therefore, the pressure loss of draft is increased.

For the above reasons, the pressure loss generated in the air passage in the intermediate temperature region, which is most frequently used through the year, becomes larger than that of the plate door type. Accordingly, noise is increased in the operation of the blower and further the electric power consumption of the blower is increased.

SUMMARY OF THE INVENTION

The present invention has been accomplished to solve the above problems. It is an object of the present invention to provide an air mixing type air conditioner for vehicle use characterized in that: a pressure loss in the air passage in the intermediate temperature region can be reduced; and the blowing air temperature control characteristic is excellent.

In order to accomplish the above object, according to a first aspect of the present invention, both an air mixing door (9) for the cold air for adjusting a passage area of the cold air passage (6); and an air mixing door (10) for the hot air for adjusting a passage area of the hot air passage (7) are composed of a sliding door for adjusting the passage area when the air mixing door (9) for the cold air and the air mixing door (10) for the hot air are slid in a direction perpendicular to the flow of air in both the passages (6, 7), and while one of the air mixing door (9) for the cold air and the air mixing door (10) for the hot air is maintaining one of the passages (6, 7) in a fully opened state, an operating position of the other door is adjusted so that a passage area of the other passage is adjusted and a temperature of the air blowing out into a vehicle compartment is adjusted.

According to this air mixing type air conditioner for vehicle use, both air mixing doors (10) are composed of a sliding door which slides in a direction perpendicular to the air flowing direction in both passages (6, 7). Therefore, it is unnecessary to provide an operation space which is required for the plate door so that the plate door can be rotated. Accordingly, the air conditioner can be made smaller.

Further, when each air mixing door (10) is slid in a direction perpendicular to the direction of air flow, the passage area of each passage (6, 7) is adjusted. Therefore, only the passage opening corresponding to the operating position (sliding distance) of each air mixing door (10) is always formed in each passage (6, 7). A flow of air passes only in this passage opening and flows into each passage (6, 7).

Accordingly, when each air mixing door (10) is opened from the fully closed state of each passage (6, 7), the passage area is not suddenly increased, which is unlike the passage area of the rotary plate type door. Therefore, it is possible to linearly change a rate of flow of air of each passage (6, 7) corresponding to the position at which each air mixing door (10) is operated. As a result, it is possible to provide a linear controlling characteristic of controlling the blowing air temperature. Therefore, the controlling operation can be easily performed.

Further, while one of the air mixing doors (9, 10) is maintained so that one of the passages (6, 7) can be fully opened, the operating position of the other door is adjusted. Due to the foregoing, the passage area of the other passage can be adjusted so that the temperature of the blowing air into the vehicle compartment can be adjusted. Therefore, in the intermediate temperature controlling region, both the cold air passage (6) and the hot air passage (7) can be fully opened at the same time.

For the above reasons, compared with the conventional film door type air mixing door, the pressure loss of draft can be greatly reduced, and the noise generated by the blower can be very effectively reduced, and, further, the electric power consumption of the motor for driving the blower can be very effectively reduced.

According to a second aspect of the present invention, a maximum cooling state is set when the cold air passage (6) is fully opened by the air mixing door (9) for the cold air and the hot air passage (7) is fully closed by the air mixing door (10) for the hot air, a maximum heating state is set when the cold air passage (6) is fully closed by the air mixing door (9) for the cold air and the hot air passage (7) is fully opened by the air mixing door (10) for the hot air, and a state in which both passages are simultaneously fully opened, in which the cold air passage (6) is fully opened by the air mixing door (9) for the cold air and the hot air passage (7) is fully opened by the air mixing door (10) for the hot air, is set in an intermediate temperature control region formed between the maximum cooling state and the maximum heating state.

As described above, when the cold air passage (6) and the hot air passage (7) are fully opened at the same time, it is possible to effectively realize a reduction in the pressure loss of draft.

According to a third aspect of the present invention, the sliding door composing the air mixing door (9) for the cold air or the air mixing door (10) for the hot air can be concretely composed of a flexible thin film member (9a, 10a).

According to a fourth aspect of the present invention, when one end portion of the thin film member (9a, 10a) is fixed and the other end portion of the thin film member (9a, 10a) is moved in a direction so that the other end portion can be separated from or come close to one end portion, the length of the thin film member (9a, 10a) from one end portion in the opening portion of the cold air passage (6) or the hot air passage (7) is changed, and the passage area of the cold air passage (6) or the hot air passage (7) is changed.

Due to the foregoing, while one end portion of the thin film member (9a, 10a) is being fixed, the length of the thin film member (9a, 10a) from one end portion is changed, so that the passage area can be changed. Therefore, the thin film members (9a, 10a) are not slid on the member (the case 2 in this embodiment) composing both the passages (6, 7), and the length of the thin film member (9a, 10a) from one end portion is changed, so that the passage area can be changed.

Therefore, no sliding friction is caused between the thin film members (9a, 10a) and the passage side member (2), and a force of operating the thin film member can be reduced. The generation of noise caused by the sliding friction can be prevented.

According to a fifth aspect of the present invention, when the other end portion of the thin film member (9a, 10a) is connected to the winding shaft (9c, 10c) and the winding shaft (9c, 10c) is moved being rotated in a direction so that the winding shaft (9c, 10c) can be separated from, or come close to, one end portion of the thin film member (9a, 10a), the other end portion of the thin film member (9a, 10a) is wound by the winding shaft (9c, 10c) or leaves the winding shaft (9c, 10c).

Due to the foregoing, while the winding shaft (9c, 10c) is rotating and moving, the operating position of the other end portion of the thin film member (9a, 10a) can be positively moved.

Incidentally, the reference numerals in parentheses, used to denote the above means, are intended to show the relationship of the specific means which will be described later in an embodiment of the invention.

The present invention may be more fully understood from the description of preferred embodiments of the invention set forth below, together with the accompanying drawings.

DESCRIPTION OF PREFERRED EMBODIMENTS

Figure 1:
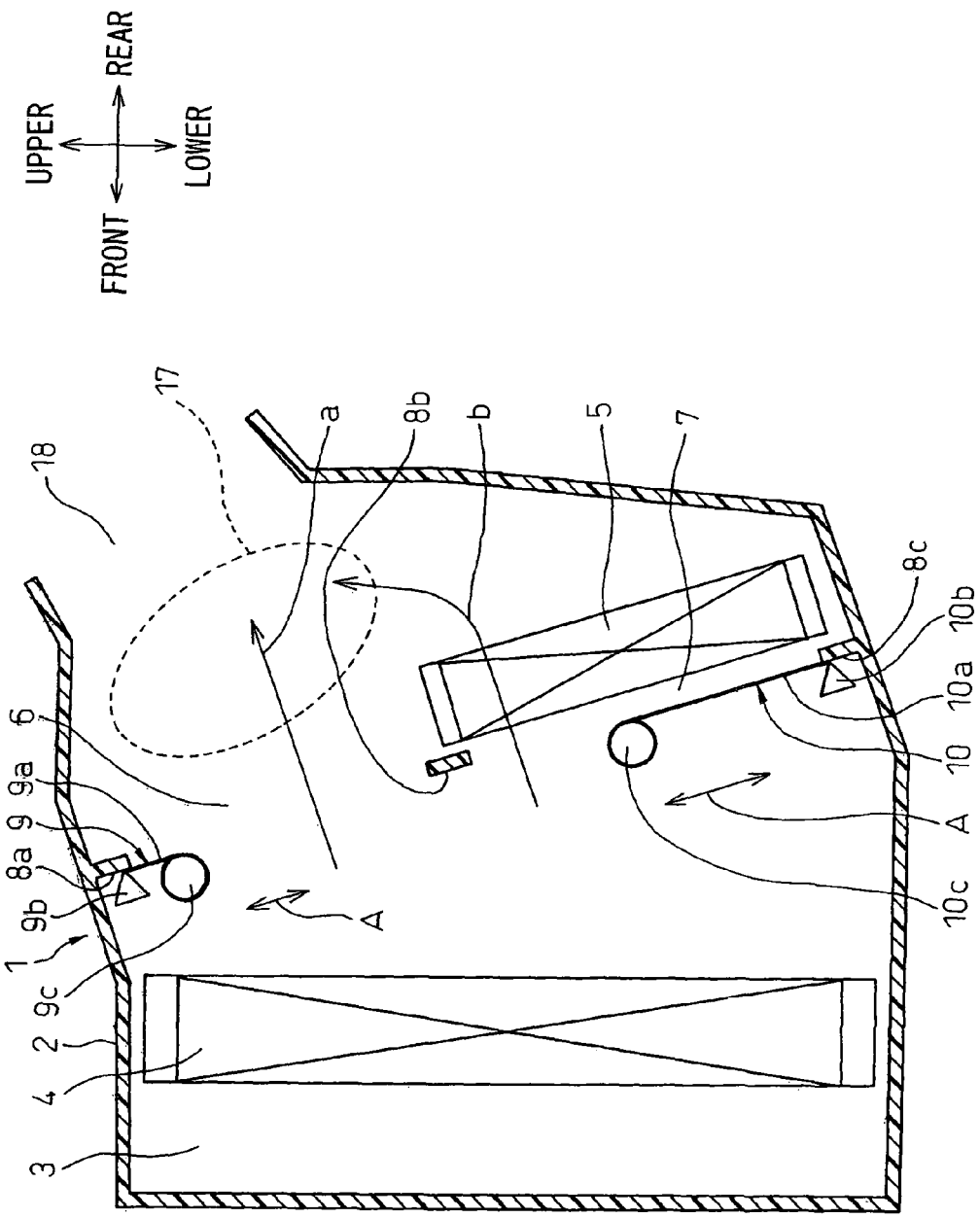
FIG. 1 is a longitudinally sectional view showing an air conditioner body unit portion of the air conditioner for vehicle use of an embodiment of the present invention.

Referring to the drawings, an embodiment of the present invention will be explained below. FIG. 1 is a longitudinally sectional view showing an air conditioner body unit 1 in the indoor air conditioner unit of the air conditioner for vehicle use of an embodiment of the present invention.

The indoor air conditioner unit of the air conditioner for vehicle use is divided into two main portions. One is a blower unit not shown in this embodiment, and the other is an air conditioner body unit 1. Arrows illustrated in FIG. 1, which are respectively directed to the front, rear, upper and lower, represent the directions of the air conditioner body unit 1 mounted on a vehicle.

The air conditioner body unit 1 is arranged inside the instrument panel, which is located in the front portion of a vehicle compartment, at the substantial center in the lateral direction of a vehicle body. That is, the air conditioner body unit 1 is arranged according to the layout in which the unit is arranged at the center. On the other hand, the blower unit 1 is arranged being offset at a position in the front of the passenger seat located on the side of the air conditioner body unit 1 in the lateral direction of the vehicle.

As well known, the blower unit includes an inside air and outside air change-over box which is arranged in an upper portion of the blower unit. A centrifugal blower is arranged in a lower portion of this inside air and outside air change-over box. Inside air or outside air introduced into this inside air and outside air change-over box is sent to the air conditioner body unit 1 by the centrifugal blower.

The air conditioner body unit 1 includes a case 2 made of resin. This case 2 is composed in such a manner that the right and left split case, which are divided on the split face (not shown) located at the center in the lateral direction of the vehicle, are connected to each other being integrated into one body by a fastening-means such as an appropriate metallic spring clamp or screw. At the front portion in this case 2, the air entrance space 3, into which air flows from the blower, is formed.

Air blown out from the blower unit 1 flows in the case 2 from the front side to the rear side of the vehicle. In the case 2, the evaporator 4 and the heater core 5 are arranged in series in this order from the upstream side to the downstream side of air.

This evaporator 4 composes the well known refrigerating cycle together with the compressor, condenser and decompressing means not shown in the drawing. That is, the evaporator 4 is a heat exchanger for cooling the air in the case 2. The evaporator 4 includes a core portion for heat exchange which is composed of flat tubes, in which a refrigerant of low pressure, decompressed by the decompressing means, flows, and corrugated fins joined to these flat tubes. Air blown out from the blower passes in this core portion for heat exchange in the longitudinal direction of the vehicle.

The heater core 5 is a heat exchanger for heating air in the case 2 while hot water (engine coolant) flowing inside is being used as a heat source. As is well known, the heater core 5 includes a core portion for heat exchange composed of flat tubes, in which hot water flows, and corrugated fins joined to the flat tubes. Air blown out from the blower passes in this core portion for heat exchange in the longitudinal direction of the vehicle.

Next, explanations will be made into a temperature adjusting mechanism for adjusting the temperature of air blowing out into the vehicle compartment. When the heater core 5, the height of which is approximately ½ of the height of the evaporator 4, is arranged in a lower space of the case 5, the cold air passage 6 is formed on the upper side of the heater core 5. This cold air passage 6 is used when a cold air flows bypassing the heater core 5. On the lower side of the cold air passage 6, the hot air passage 7 is formed. This hot air passage 7 is a passage in which a hot air to be heated by the heater core 5 flows.

Figure 2:
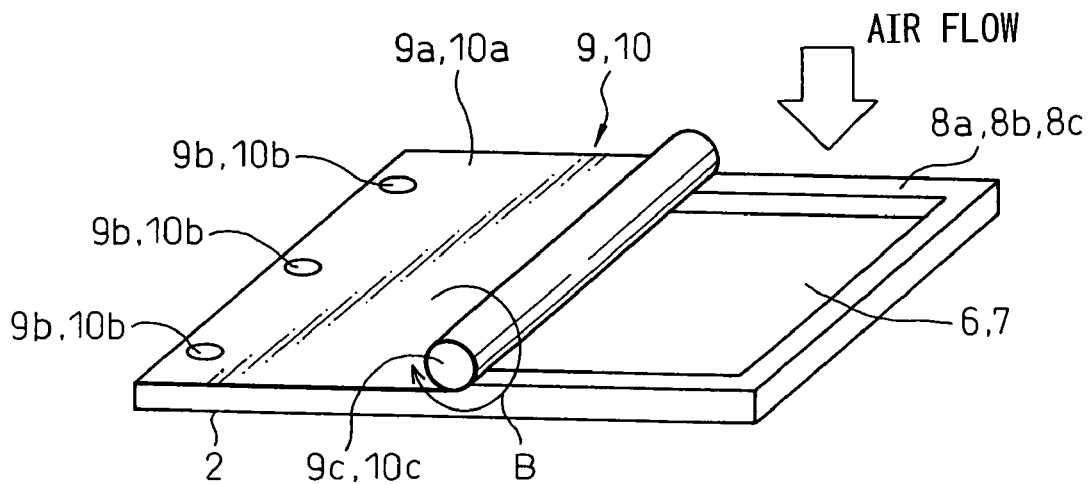
FIG. 2 is a perspective view showing an outline of the air mixing door (film door) of an embodiment of the present invention.
Figure 3:
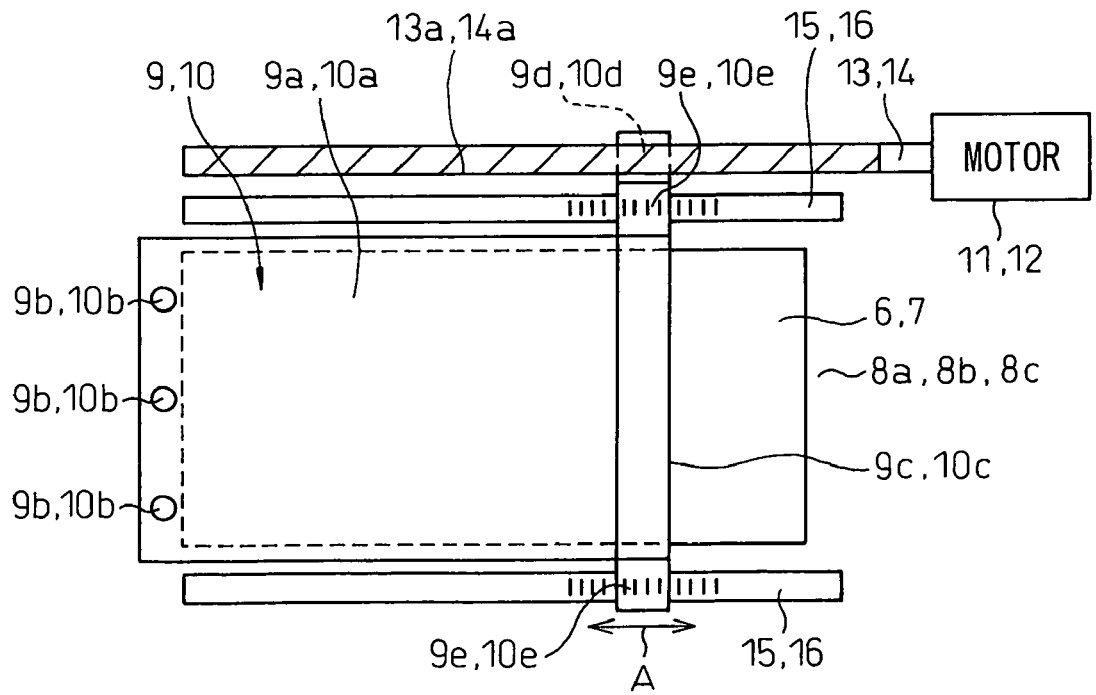
FIG. 3 is a plan view showing an operating mechanism of the air mixing door shown in FIG. 2.
Figure 5:
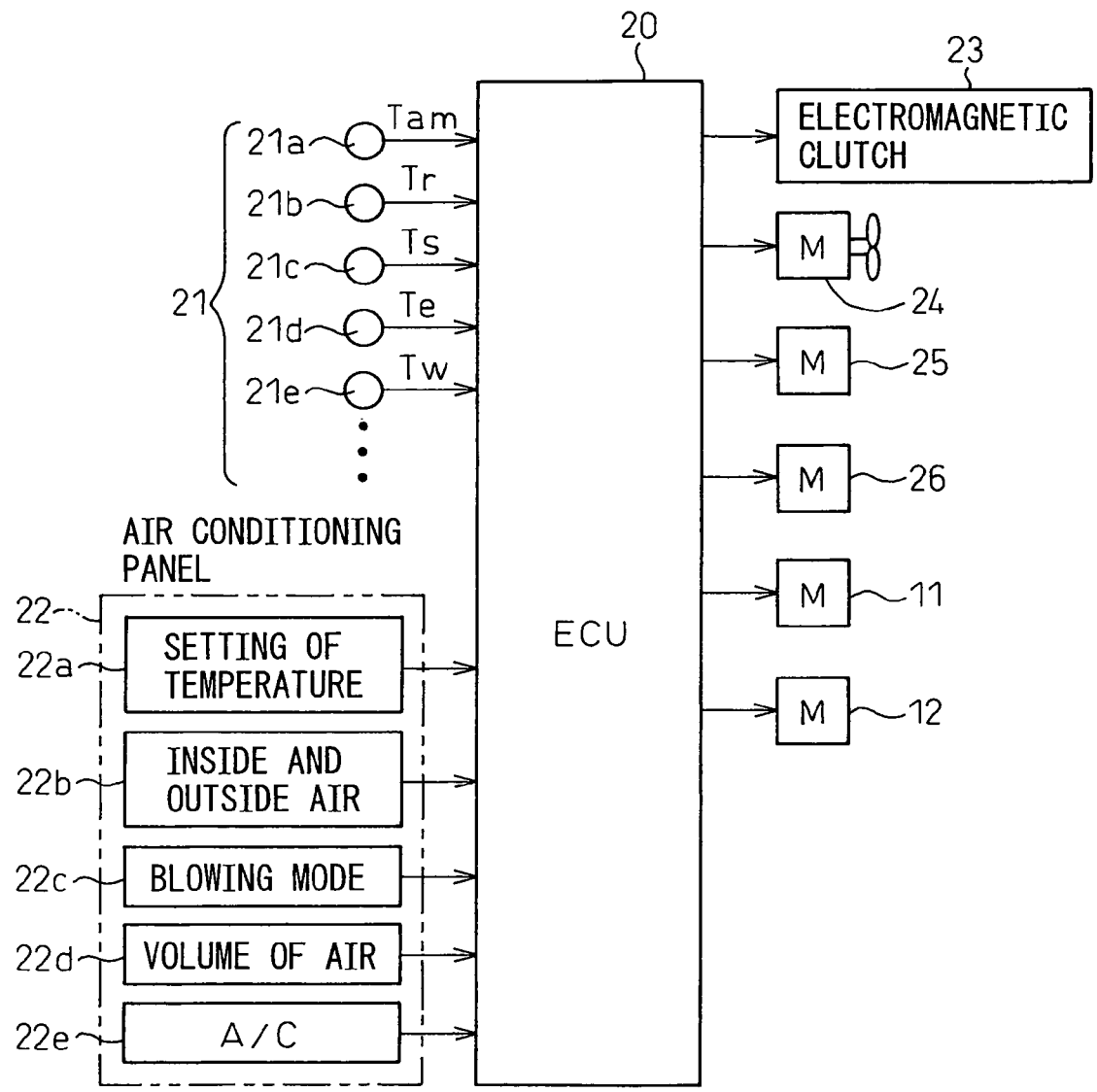
FIG. 5 is a block diagram showing an electric control section of an embodiment of the present invention.

As shown in FIGS. 2, 3 and 5, the profiles of the openings of the cold air passage 6 and hot air passage 7 are rectangular. The sealing faces 8a, 8b, 8c are formed in the opening circumferential edge portions of the cold air passage 6 and hot air passage 7 in such a manner that the sealing faces 8a, 8b, 8c are integrated with the case 2 into one body.

In the case 2, the air mixing door 9 for the cold air is arranged in the upstream portion of the cold air passage 6, and the air mixing door 10 for the hot air is arranged in the upstream portion of the heater core 5 (the hot air passage 7).

Next, the specific structure of the air mixing door 9 for the cold air and that of the air mixing door 10 for the hot air will be explained below referring to FIGS. 2 to 4. Both the air mixing doors 9, 10 are composed of a film door of the same structure in which the thin film member 9a, 10a is used.

One end portion of the thin film member 9a, 10a of the air mixing door 9, 10 is fixed onto the sealing face 8a, 8b, 8c on the case 2 side by the appropriate fixing member 9b, 10b. The fixing member 9b, 10b can be composed of a pin-shaped member having an engaging head portion. The other end portion of the thin film member 9a, 10a is connected to the winding shaft 9c, 10c.

When the winding shaft 9c, 10c is moved in the direction A (the perpendicular direction to the axial direction) so that the winding shaft 9c, 10c can approach, or separate from, the fixing position of one end portion of the thin film member 9a, 10a while the winding shaft 9c, 10c is rotating, the other end-portion of the thin film member 9a, 10a is wound round the winding shaft 9c, 10c or the other end portion of the thin film member 9a, 10a leaves the winding shaft 24c, 25c.

Specifically, operation is conducted as follows. When the winding shaft 9c, 10c is rotated in the direction of arrow B (clockwise) in FIG. 2, the other end portion of the thin film member 9a, 10a leaves the winding shaft 24c, 25c, and the other end portion of the thin film member 9a, 10a is moved together with the winding shaft 9c, 10c in the direction (to the right in FIG. 2) so that the other end portion of the thin film member 9a, 10a can be separated from one end portion (the fixed portion) of the thin film member 9a, 10a.

On the other hand, when the winding shaft 9c, 10c is rotated in the opposite direction (counterclockwise) to the direction of arrow B in FIG. 2, the other end portion of the thin film member 9a, 10a is wound by the winding shaft 24c, 25c, and the other end portion of the thin film member 9a, 10a is moved together with the winding shaft 9c, 10c in the direction (to the left in FIG. 2) so that the other end portion of the thin film member 9a, 10a can approach one end portion (the fixed portion) of the thin film member 9a, 10a.

Due to the foregoing, the position of the other end portion of the thin film member 9a, 10a is changed in the direction of arrow A together with the winding shaft 9c, 10c, and the length (the sending length) of the thin film member 9a, 10a from one end portion is changed. Due to the foregoing, the cold air passage 6 and the hot air passage 7 are opened and closed.

As described above, as the winding shaft 9c, 10c is moved in the direction A of moving the door while the winding shaft 9c, 10c is being rotated, various mechanisms can be adopted for operating the door. In this embodiment, the door operating mechanism is composed of a worm gear mechanism.

Figure 4:
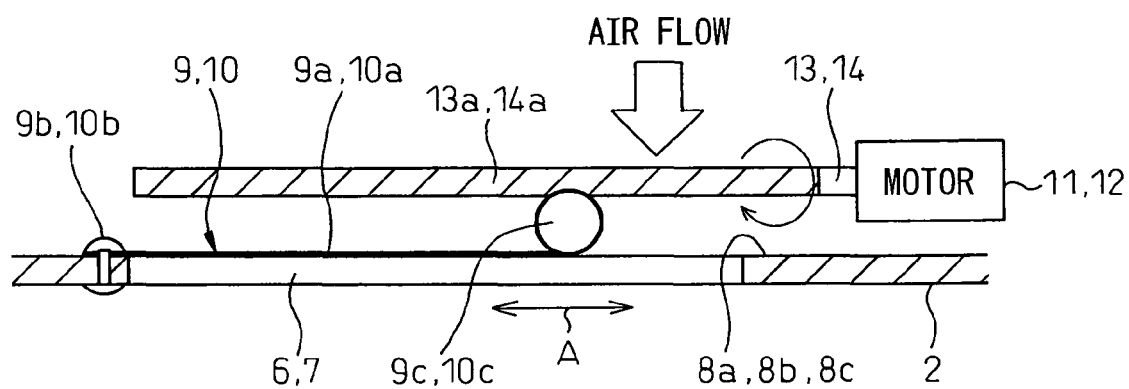
FIG. 4 is a sectional view of FIG. 3.

Specifically, as shown in FIGS. 3 and 4, the exclusive actuator 11, 12 is arranged for each winding shaft 9c, 10c. This actuator 11, 12 is composed of a servo motor and drives the worm shaft 13, 14. This worm shaft 13, 14 is arranged being perpendicular to each winding shaft 9c, 10c.

In this case, the worm shaft 13, 14 is arranged on the side of the opening of the cold air passage 6 or the hot air passage 7 so that the worm shaft 13, 14 cannot obstruct the draft of the cold air passage 6 or the hot air passage 7. On the outer circumferential face of the worm shaft 13, 14, the worm 13a, 14a, which is formed into a screw, is formed all along the length of the worm shaft 13, 14 in the moving range of the winding shaft 9c, 10c in the direction of arrow A. In one end portion of the winding shaft 9c, 10c in the axial direction, the worm wheel 9d, 10d is provided (shown in FIG. 3). This worm wheel 9d, 10d is meshed with the worm 13a, 14a.

On the other hand, on the sealing faces 8a, 8b, 8c formed in the circumferential edge of the cold air passage and the hot air passage, the racks 15, 16 are provided being adjacent to the right and left outside in the ranges with which the thin film members 9a, 10a come into contact. The pinions 9e, 10e meshed with the racks 15, 16 are provided at both end portions of the winding shaft 9c, 10c in the axial direction.

The worm shaft 13, 14 and the racks 15, 16 are arranged in parallel with the winding shaft moving direction A. The worm 13a, 14a of the worm shaft 13, 14 and the rack 15, 16 are formed all over the length in the moving range of the winding shaft 9c, 10c in the direction of arrow A.

When the worm shaft 13, 14 is driven by the actuator 11, 12, as the worm 13a, 14a and the worm wheel 9d, 10d are meshed with each other, the winding shaft 9c, 10c is rotated. At this time, since the pinions 9e, 10e of the winding shaft 9c, 10c are respectively meshed with the racks 15, 16, the winding shaft 9c, 10c is positively rotated and moved in the direction of arrow A without causing any slippage. Accordingly, when a quantity of rotation of the actuator 11, 12 is controlled, a quantity of rotation of each winding shaft 9c, 10c can be controlled. Due to the foregoing, a moving position of each winding shaft 9c, 10c in the direction of arrow A can be controlled.

In this connection, concerning the material of the thin film member 9a, 10a, as long as it is a flexible resin film material capable of being wound round the winding shaft 9c, 10c, any material can be used. For example, a PET (polyethylene terephthalate) film or PPS (polyphenylene sulfide) film may be preferably used. The thickness of the thin film member 9a, 10a is, for example, approximately 200 μm.

Next, referring to FIG. 1, the specific arrangements of the air mixing door 9 for the cold air and the air mixing door 10 for the hot air with respect to the air conditioner unit 1 will be explained below. In the air mixing door 9 for the cold air, one end portion of the thin film member 9a, that is, the upper end portion is fixed to the sealing face 8a of the upper end portion of the entrance opening portion of the cold air passage 6 by the fixing member 9b, and the other end portion of the thin film member 9a, that is, the lower end portion is connected to the winding shaft 9c. Therefore, the lower end portion of the thin film member 9a is moved in the vertical direction (the direction of arrow A) together with the winding shaft 9c.

On the other hand, in the air mixing door 10 for the hot air, one end portion of the thin film member 10a, that is, the lower end portion is fixed to the sealing face 8c of the lower end portion of the entrance opening portion of the hot air passage 7 by the fixing member 10b, and the other end portion of the thin film member 10a, that is, the upper end portion is connected to the winding shaft 10c. Therefore, the upper end portion of the thin film member 10a is moved in the vertical direction (the direction of arrow A) together with the winding shaft 10c.

In the air mixing door 9 for the cold air, when the winding shaft 9c is moved in the vertical direction A, the position of the lower end portion of the thin film member 9a is displaced, and the area of the passage (opening) of the cold air passage 6 is increased or decreased. In the same manner, in the air mixing door 10 for the hot air, when the winding shaft 10c is moved in the vertical direction A, the position of the lower end portion of the thin film member 10a is displaced, and the area of the passage (opening) of the hot air passage 7 is increased or decreased.

Due to the foregoing, a ratio of the passage area of the cold air passage 6 to the passage area of the hot air passage 7 is adjusted, and a ratio of the volume of the cold air "a" flowing in the cold air passage 6 to the volume of the hot air "b" flowing in the hot air passage 7 is adjusted.

In this connection, in FIG. 1, the sealing face 8b provided on the case side is located between the cold air passage 8b and the hot air passage 7. When the winding shaft 9c for the cold air is moved to the position of the sealing face 8b located at the intermediate position in the vertical direction, the cold air passage 6 is fully closed by the thin film member 9a for the cold air. When the winding shaft 10c for the hot air is moved to the position of the sealing face 8b, the hot air passage 7 is fully closed by the thin film member 10a for the hot air.

Inside the case 2, the air mixing portion 17 is formed on the downstream side (the rear side of the vehicle) of the cold air passage 6. In this air mixing portion 17, the cold air "a" sent from the cold air passage 6 and the hot air "b" sent from the hot air passage 7 are mixed with each other. In this connection, the hot air passage 7 is bent upward on the downstream side (the rear side of the vehicle) of the heater core 5. Therefore, the hot air "b" flows toward the air mixing portion 17 arranged in the upper portion of the heater core 5.

In the upper portion of the case 2 on the rear side of the vehicle, the blowing opening portion 18 is formed being adjacent to the air mixing portion 17. Conditioned air, the temperature of which has been adjusted in the air mixing portion 17, is blown out from this blowing opening portion 18. Specifically, as the blowing opening portion 18, the following opening portions are provided. There are provided a foot opening portion from which conditioned air is blown out toward the feet of the passenger, a face opening portion from which conditioned air is blown out toward the upper half of the body of the passenger and a defroster opening portion from which conditioned air is blown out toward the inner face of the windshield. The plurality of blowing opening portions 18 are changed over so that they can be opened and closed according to the blowing mode door not shown in the drawing.

FIG. 5 is a block diagram of the electric control section of this embodiment. The air conditioner control unit 20 is composed of a well known microcomputer, which includes CPU, ROM and RAM, and peripheral circuits. The control program for controlling the air conditioner is stored in ROM. According to the control program, various calculations and processing are conducted. The sensor detecting signals sent from a group of sensors 21 and the operation signals sent from the air conditioner panel 22 are inputted onto the input side of the air conditioner control unit 20.

The group of sensors 21 include: a well known outside air temperature sensor 21a; an inside air temperature sensor 21b; a sunshine sensor 21c; an evaporator blowing air temperature sensor 21d; and a hot water (engine coolant) temperature sensor 21e.

The air conditioner panel 22 includes: a well known temperature setting switch 22a; an inside and outside air changeover switch 22b; a blowing mode switch 22c; a air volume changeover switch 22d; and an air conditioner switch 22e for turning on and off the operation of the refrigerating cycle compressor not shown in the drawing.

The electromagnetic clutch 23, not shown, of the compressor, the blower drive motor 24, not shown, of the blower unit, the actuator 25, not shown, for driving the inside and outside air changeover door, the actuator 26, not shown, for driving the blowing mode changeover door, the actuator 11 for driving the winding shaft 9c of the air mixing door 9 for the cold air and the actuator 12 for driving the winding shaft 10c of the air mixing door 10 for the hot air are connected to the output side of the air conditioner control unit 20. Operation of these devices is controlled by the output signals sent out from the air conditioner control unit 20.

Operation of the present embodiment, composed as described, above will be explained below. The air conditioner control unit 20 reads in the detection signals sent from the group of sensors 41 and the operation signals sent from the air conditioner panel 42 and calculates the target blowing temperature TAO of air blowing out from the blowing opening portion 18 into the vehicle compartment. This target blowing temperature TAO is the temperature of a air blown out into the vehicle compartment which is necessary for maintaining the temperature in the vehicle compartment at the setting temperature $T_{set}$ which has been set by the temperature setting switch 22a irrespective of the fluctuation of the air conditioning heat load. As well known, TAO is calculated according to this setting temperature $T_{set}$ and also according to the outside temperature $T_{am}$, the inside temperature $T_r$ and the quantity of sunshine $T_s$ which are detected by the sensors 21a to 21c.

The air conditioning control unit 20 individually determines the operating position of the air mixing door 9 for the cold air and the operating position of the air mixing door 10 for the hot air according to the target blowing temperature TAO, the evaporator blowing air temperature $T_e$ and the hot water temperature $T_w$ and controls the operating positions of the air mixing door 9 for the cold air and the air mixing door 10 for the hot air. In this way, the temperature of the air blown out into the vehicle compartment can be controlled so that it can become the target blowing temperature TAO.

Figure 6A:
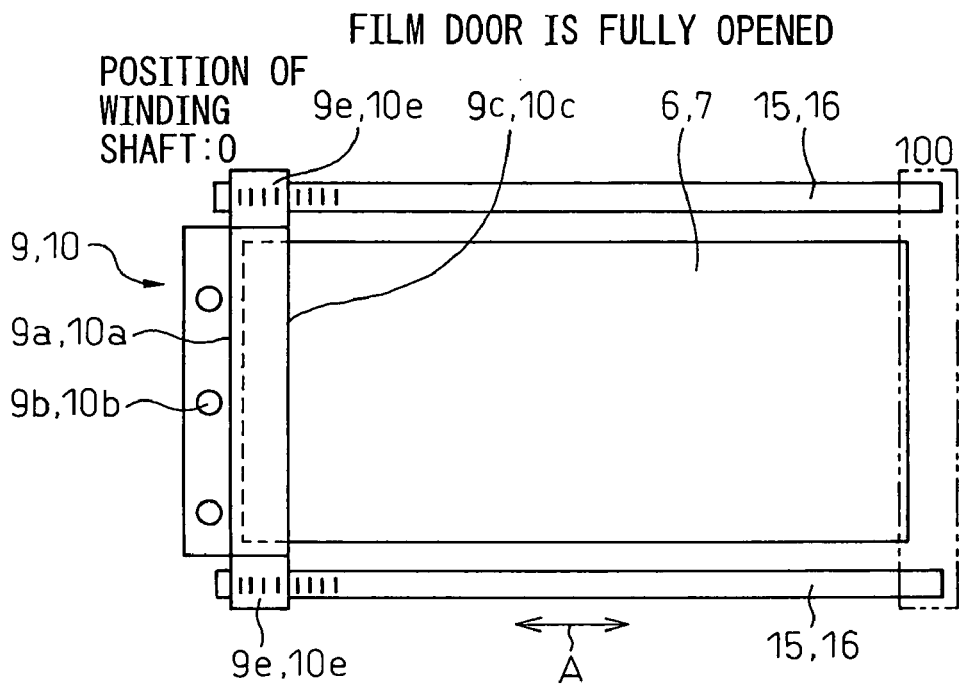
FIG. 6A is a plan view showing a fully opened state of the air mixing door (film door) shown in FIG. 2.

Referring to FIGS. 6 and 7, operational position control of the air mixing door 9 for the cold air and the air mixing door 10 for the hot air will be specifically explained as follows. FIG. 6A shows a state in which the thin film member 9a, 10a is wound, by the winding shaft 9c, 10c, to the maximum when the winding shaft 9c, 10c of the air mixing door 9 for the cold air or the air mixing door 10 for the hot air is moved to a position closest to the fixing position of one end portion of the thin film member 9a, 10a. In this state, the cold air passage 6 and the hot air passage 7 are fully opened.

Figure 6B:
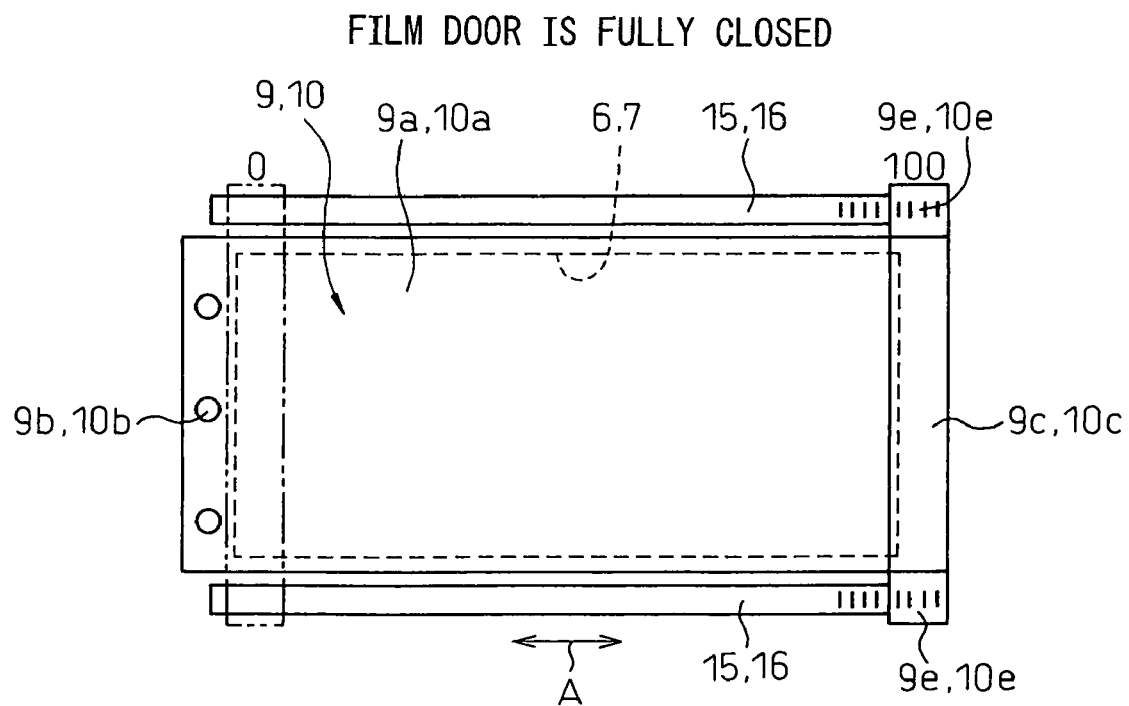
FIG. 6B is a plan view showing a fully closed state of the air mixing door (film door) shown in FIG. 2.

On the other hand, FIG. 6B shows a state in which the thin film member 9a, 10a leaves (is rewound) the winding shaft 9c, 10c to the maximum when the winding shaft 9c, 10c of the air mixing door 9 for the cold air or the air mixing door 10 for the hot air is moved to a position most distant from the fixing position of one end portion of the thin film member 9a, 10a. In this state, the cold air passage 6 and the hot air passage 7 are fully closed by the thin film members 9a, 10a.

The position at which the winding shaft 9c, 10c fully opens the passage as shown in FIG. 6A is represented by "0" hereinafter, and the position at which the winding shaft 9c, 10c fully closes the passage as shown in FIG. 6B is represented by "100" hereinafter.

Figure 7A:
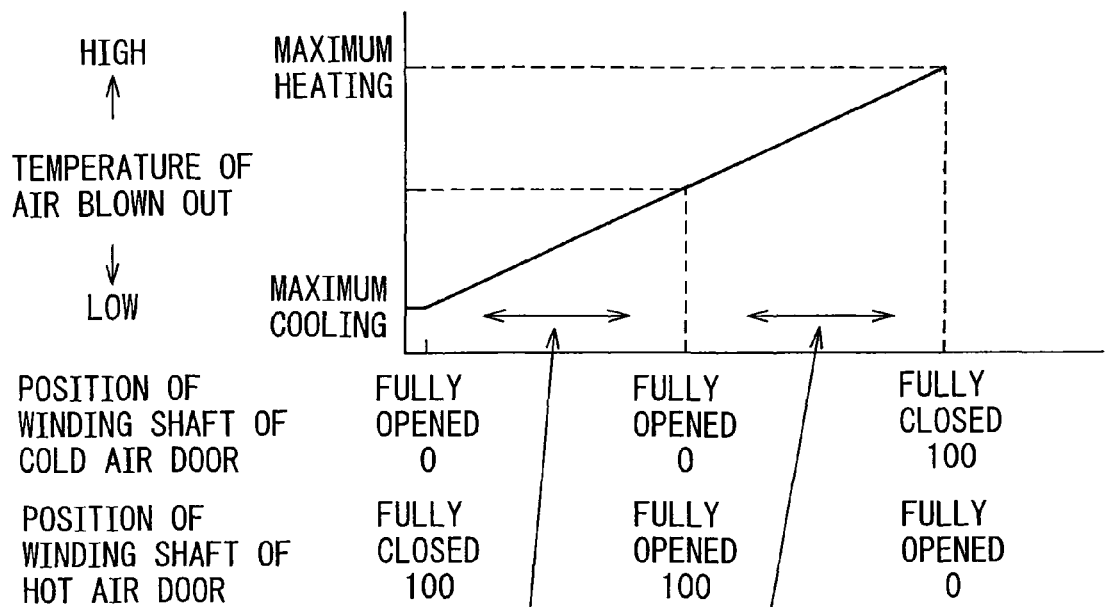
FIGS. 7A-7F are schematic illustrations for explaining operation of the air mixing door (film door) of an embodiment of the present invention.

In FIG. 7A, the axis of abscissa represents the moving position of the winding shaft 9c, 10c, and the axis of ordinate represents the temperature of the air blown out into the vehicle compartment.

Figure 7B:
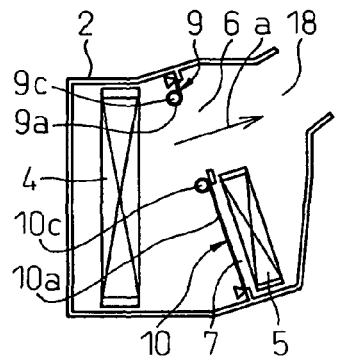

In the case where the air conditioner is set at the maximum cooling state in which the air blown out into the vehicle compartment is cooled at the maximum according to the target blowing temperature TAO calculated by the air conditioning control unit 20, the air mixing door 9 for the cold air or the air mixing door 10 for the hot air is operated at the operating position shown in FIG. 7B.

Specifically, the operation is conducted as follows. The winding shaft 9c of the air mixing door 9 for the cold air is moved to the passage fully opened position "0", by the actuator 11, so as to fully open the cold air passage 6. At the same time, the winding shaft 10c of the air mixing door 10 for the hot air is moved to the passage fully closed position "100" so as to fully close the hot air passage 7. Due to the foregoing, all the cold air "a", which has been cooled by the evaporator 4, passes through the cold air passage 6 and blows out from the blowing opening portion 18 into the vehicle compartment, and the maximum cooling performance can be exhibited.

Figure 7D:
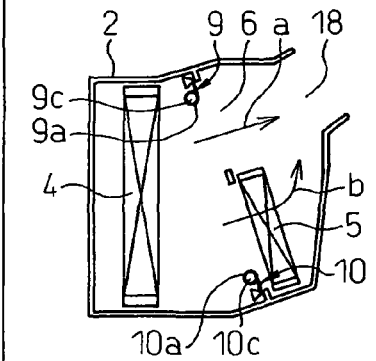
Figure 7F:
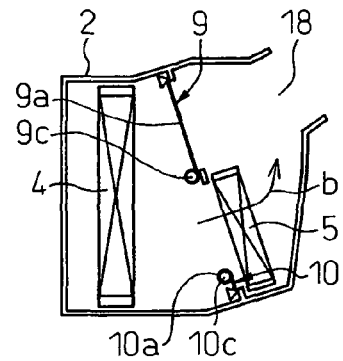
Figure 7C:
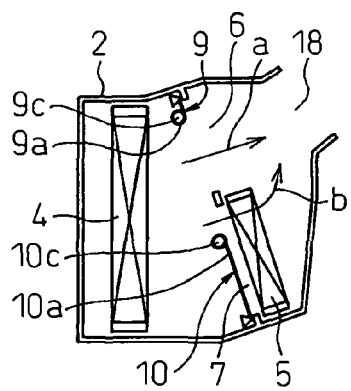

Next, FIG. 7C shows a state in which the target blowing temperature TAO rises and the operating positions of the air mixing door 9 for the cold air and the air mixing door 10 for the hot air are moved a little from the maximum cooling position to the temperature control region. Specifically, the operation is conducted as follows. The winding shaft 9c of the air mixing door 9 for the cold air is maintained at the passage fully opened position "0", and the fully opened state of the cold air passage 6 is maintained. On the other hand, the winding shaft 10c of the air mixing door 10 for the hot air is moved to an intermediate position "50" between the passage fully closed position "100" and the passage fully opened position "0". Due to the foregoing, the thin film member 10a of the air mixing door 10 for the hot air opens the hot air passage 7 by about 50%.

Accordingly, a portion of the cold air, which has passed through the evaporator 4, flows into the hot air passage 7 and becomes the hot air "b". This hot air "b" is mixed with the cold air "a". Therefore, the temperature of the air blowing into the vehicle compartment can be raised.

Next, FIG. 7D shows a state in which the temperature of the air blown into the vehicle compartment is raised higher than the state shown in FIG. 7C. Specifically, both the winding shaft 9c of the air mixing door 9 for the cold air and the winding shaft 10c of the air mixing door 10 for the hot air are operated so that the winding shafts move to the passage fully opened position "0". Accordingly, both the cold air passage 6 and the hot air passage 7 are fully opened. Due to the foregoing, compared with the state shown in FIG. 7C, a rate of the volume of the hot air "b" is increased, and the temperature of the air blown out into the vehicle compartment can be raised.

Further, since both the cold air passage 6 and the hot air passage 7 are fully opened, the passage area in the case 2 can be maximized. Accordingly, a pressure loss of draft in the case 2 can be minimized. Especially, the state shown in FIG. 7D, that is, the intermediate temperature control state is a control region most frequently used through the year. Therefore, the generation of blower noise, which is generated when the air conditioner is operated, and the consumption of electric power by the blower drive motor 24 can be effectively reduced.

Figure 7E:
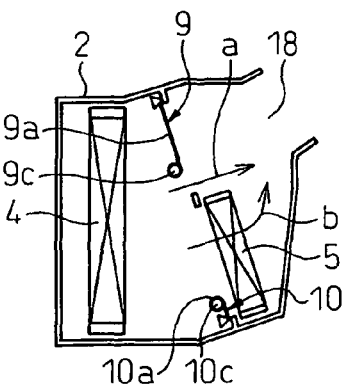
Figure 8B:
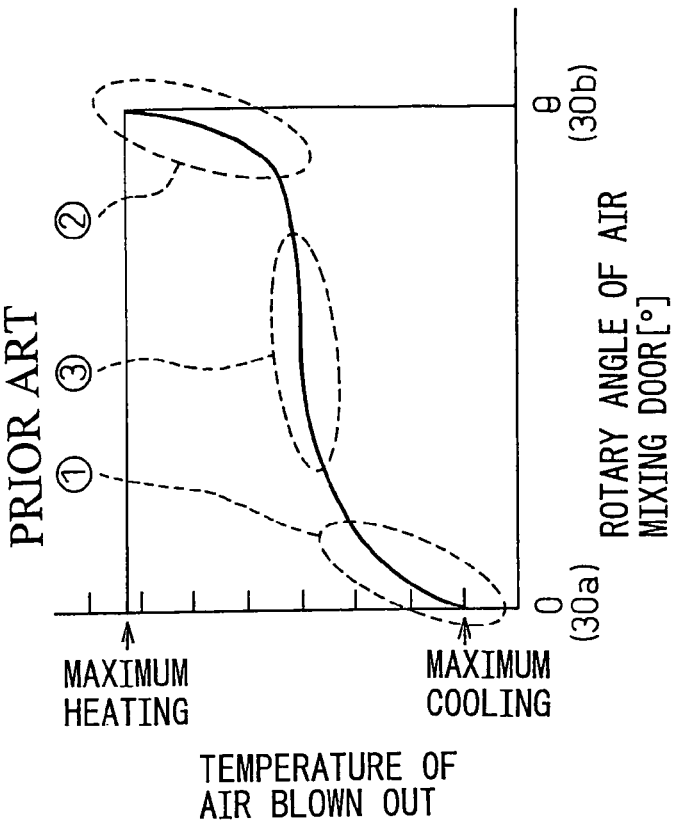
FIG. 8B is a temperature control characteristic diagram of the air conditioner body unit portion shown in FIG. 8A.
Figure 8A:
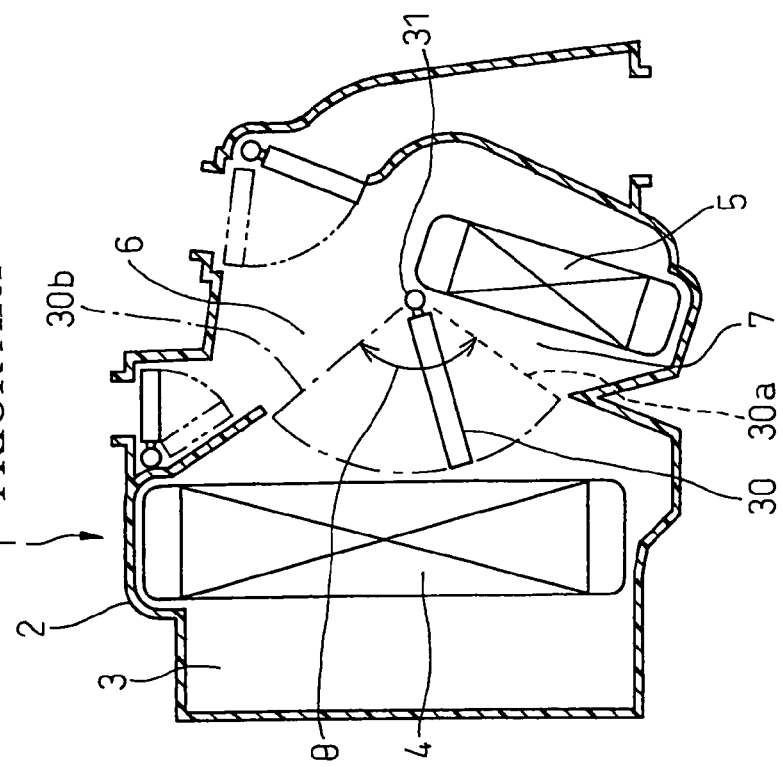
FIG. 8A is a longitudinally sectional view showing an air conditioner body unit portion of the air conditioner for vehicle use of the prior art.
Figure 9B:
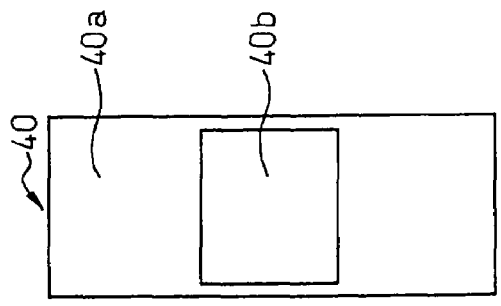
FIG. 9B is a plan view of the thin film member shown in FIG. 9A.
Figure 9C:
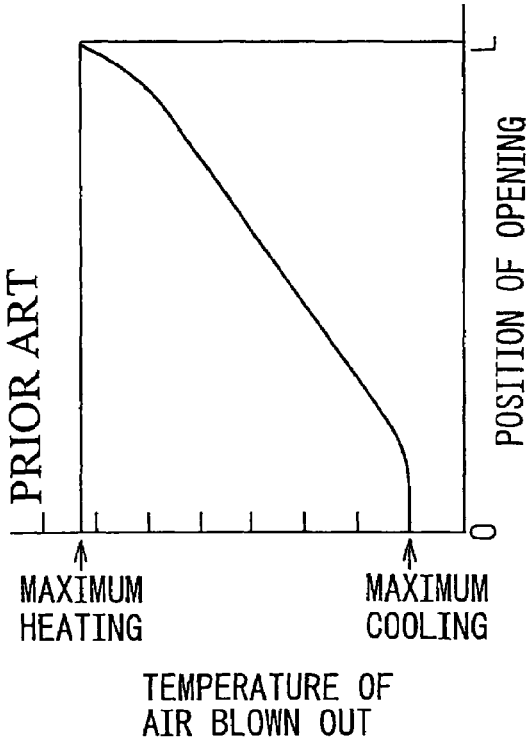
FIG. 9C is a temperature control characteristic diagram of the air conditioner body unit portion shown in FIG. 9A.
Figure 9A:
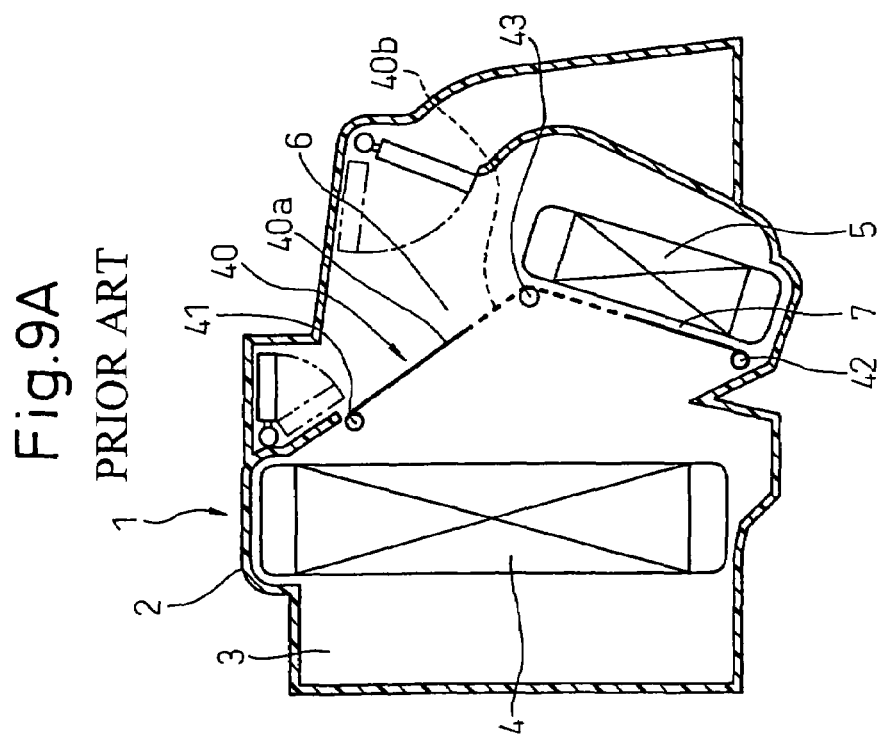
FIG. 9A is a longitudinally sectional view showing an air conditioner body unit portion of the air conditioner for vehicle use of another prior art.

Next, FIG. 7E shows a state in which the temperature of the air blown into the vehicle compartment is raised higher than the state shown in FIG. 7D. Specifically, while the winding shaft 10c of the air mixing door 10 for the hot air is being maintained at the passage fully opened position "0", the winding shaft 9c of the air mixing door 9 for the cold air is moved to the neighborhood of the intermediate position "50" between the passage fully closed position "100" and the passage fully opened position "0". Due to the above operation, the cold air passage 6 is half opened, and a volume of the cold air is decreased and a volume of the hot air is increased. Accordingly, the blowing air temperature can be raised.

Next, FIG. 7F shows a state which is set at the maximum heating state in which the temperature of the air blown out into the vehicle compartment is heated to the maximum temperature. Specifically, while the winding shaft 10c of the air mixing door 10 for the hot air is being maintained at the passage fully opened position "0", the winding shaft 9c of the air mixing door 9 for the cold air is moved to the passage fully closed position "100". Due to the foregoing, the hot air passage 7 is fully opened and the cold air passage 6 is fully closed. Therefore, all blast, which has passed through the evaporator 4, can be heated by the heater core 5, and the maximum heating performance can be exhibited.

In this connection, both the air mixing door 9 for the cold air and the air mixing door 10 for the hot air are composed of a film door made of thin film member 9a, 10a, and the other end portion of the thin film member 9a, 10a is wound by the winding shaft 9c, 10c on the sealing faces 8a to 8c and sent out from the winding shaft 9c, 10c, so that the passage areas (the openings) of the cold air passage 6 and the hot air passage 7 are changed. Therefore, the passage areas of the cold air passage 6 and the hot air passage 7 can be substantially proportionally changed according to the changes in the operating position of the winding shafts 9c, 10c.

As a result, when the operating positions of the winding shafts 9c, 10c are changed, a ratio of the volume of the cold air to the volume of the hot air can be substantially proportionally changed, and the temperature of the air blown out into the vehicle compartment can be linearly changed between the maximum cooling state and the maximum heating state as shown in FIG. 7A. Accordingly, a reduction of blower noise made by the reduction of the pressure loss in the intermediate temperature control region and a reduction in the electric power consumption of the motor 24 for driving the blower can be compatible with an improvement in the temperature control characteristic in the neighborhoods of the maximum cooling state and the maximum heating state.

According to the operating mechanisms of the air mixing door 9 for the cold air and the air mixing door 10 for the hot air of the present embodiment, the following effects can be provided.

(1) While one end portion of the thin film member 9a, 10a composing the air mixing door 9 for the cold air or the air mixing door 10 for the hot air is being fixed to the case 2, the other end portion of the thin film member 9a, 10a is wound by the winding shaft 9c, 10c on the sealing faces 8a to 8c on the case 2 side, or alternatively, the other end portion of the thin film member 9a, 10a leaves the winding shaft 9c, 10c. Since operation is only conducted as described above, both the thin film members 9a, 10a are not slid on the sealing faces 8a to 8c.

Therefore, no sliding friction is generated between both the thin film members 9a, 10a and the case 2, and both the thin film members 9a, 10a are essentially driven by a rolling force.

Accordingly, an intensity of the operating force to drive both the thin film members 9a, 10a can be greatly decreased as compared with the prior art.

(2) Since no sliding friction is caused on both the thin film members 9a, 10a, it is unnecessary to provide the tensile strength and the tearing strength, which resist the sliding frictional force, on both the thin film members 9a, 10a. As a result, concerning the specific material of both the thin film members 9a, 10a, it is possible to use resin film material such as PET film material or PPS film material as it is. Accordingly, the material cost can be reduced.

(3) Since no sliding friction is caused in both the thin film members 9a, 10a, it is possible to prevent the generation of sliding frictional noise.

(4) Since the pinions 9e, 10e of the winding shafts 9c, 10c are meshed with the racks 15, 16 on the case 2 side, the winding shafts 9c, 10c can be positively rotated by the rotation of the worm shafts 13, 14. Accordingly, it is possible to prevent the winding shafts 9c, 10c from slipping.

Finally, an explanation will be given of another embodiment.

In the aforementioned embodiment, one end portion of the thin film member 9a, 10a composing the air mixing door 9 for the cold air or the air mixing door 10 for the hot air is fixed to the case 2 side, and the other end portion of the thin film member 9a, 10a is wound by the winding shaft 9c, 10c on the sealing faces 8a to 8c on the case side or the other end portion of the thin film member 9a, 10a is sent out from the winding shaft 9c, 10c, so that the passage (opening) areas of the cold air passage 6 and the hot air passage 7 can be changed. However, it should be noted that the present invention is not limited to the above specific door structure, and the door structure can be deformed as follows.

For example, as described in Japanese Unexamined Patent Publication No. 2002-79819, the following constitution may be adopted. A sliding door is used, in which a flexible thin film member is slid on a sealing face on the case side so as to compose the air mixing door 9 for the cold air and the air mixing door 10 for the hot blast.

To be specific, when the thin film member of the air mixing door 9 for the cold air and the thin film member of the air mixing door 10 for the hot air are respectively slid on the sealing faces on the case side along the guide grooves formed on the case side, the passage (opening) areas of the cold air passage 6 and the hot air passage 7 can be independently changed as shown in FIG. 7.

Accordingly, even when the passage areas of the cold air passage 6 and the hot air passage 7 are changed by the air mixing door 9 for the cold air and the air mixing door 10 for the hot air composed of the sliding door described in Japanese Unexamined Patent Publication No. 2002-79819, a pressure loss in draft in the intermediate temperature region can be reduced. Further, the temperature control characteristic in the neighborhoods of the maximum cooling state and the maximum heating state can be improved.

However, this variation is disadvantageous as follows. As the thin film member slides on the sealing face provided on the case side, a sliding resistance is generated between the thin film member and the sealing face provided on the case side.

Alternatively, the following constitution may be adopted. The air mixing door 9 for the cold air and the air mixing door 10 for the hot air are composed of not a flexible thin film member but a solid sliding door. When this solid sliding door is slid on the sealing face provided on the case side, the passage areas of the cold air passage 6 and the hot air passage 7 are independently changed as shown in FIG. 7.

After all, the air mixing door 9 for the cold air and the air mixing door 10 for the hot air may be composed of a sliding door for adjusting the passage area when sliding door slides in a direction perpendicular to the direction of air flow in the cold air passage 6 and the hot air passage 7.

While the invention has been described by reference to specific embodiments chosen for purposes of illustration, it should be apparent that numerous modifications could be made thereto by those skilled in the art without departing from the basic concept and scope of the invention.

What is claimed is:

1. An air conditioner for vehicle use comprising:
a cold air passage in which cold air flows;
a hot air passage in which hot air flows;
a movable cold air door for adjusting a passage area of the cold air passage, means for moving the movable cold air door in a direction generally perpendicular to the cold flow between a first position closing the cold air passage and a second position fully opening the cold air passage;
a movable hot air door for adjusting a passage area of the hot air passage, means for moving the movable hot air door in a direction generally perpendicular to the hot air flow between a first position closing the hot air passage and a second position fully opening the hot air passage;
means for controlling the hot air door and the cold air door to define a maximum cooling condition where the movable cold air door is in its second position and the movable hot air door is in its first position; an intermediate cooling condition where the movable cold air door is in its second position and the movable hot air door is between its first and second position; a mid temp condition where the movable cold air door is in its second position and the movable hot air door is in its second position; an intermediate heating condition where the movable cold air door is between its first and second positions and the movable hot air door is in its second position; and a maximum heating condition where the movable cold air door is in its first position and the movable hot air door is in its second position.

2. An air conditioner for vehicle use according to claim 1, wherein the movable cold air door and the movable hot air door each comprise a flexible thin film member.

3. An air conditioner for vehicle use according to claim 2 wherein, when one end portion of each of the thin film members is fixed and the other end portion of each of the thin film members is moved in a direction so that the other end portion can be separated from or come close to the one end portion, a length of each of the thin film members from the one end portion in the opening portion of the cold air passage or the hot air passage is changed, and the passage area of the cold air passage or the hot air passage is changed.

4. An air conditioner for vehicle use according to claim 3 wherein, when the other end portion of each of the thin film members is connected to a winding shaft and each of the winding shafts is rotated in a direction so that the winding shaft can be separated from, or come close to, a respective one end portion of the thin film member, the other end portion of the thin film member is wound onto the winding shaft or wound off of the winding shaft.

* * * * *